United States Patent
Suzuki et al.

(10) Patent No.: US 7,859,393 B2
(45) Date of Patent: Dec. 28, 2010

(54) TIRE SENSOR SYSTEM AND TIRE USED FOR THE SAME

(75) Inventors: Hirohisa Suzuki, Gunma (JP); Hiroshi Saito, Gunma (JP); Eiichiro Kuwako, Gunma (JP); Takashi Kunimi, Tokyo (JP)

(73) Assignees: Sanyo Electric Co., Ltd., Osaka (JP); Akebono Brake Industry Co., Ltd., Tokyo (JP)

( * ) Notice: Subject to any disclaimer, the term of this patent is extended or adjusted under 35 U.S.C. 154(b) by 343 days.

(21) Appl. No.: 11/918,961

(22) PCT Filed: Apr. 17, 2006

(86) PCT No.: PCT/JP2006/308030

§ 371 (c)(1),
(2), (4) Date: Oct. 22, 2007

(87) PCT Pub. No.: WO2006/118011

PCT Pub. Date: Nov. 9, 2006

(65) Prior Publication Data

US 2009/0058625 A1    Mar. 5, 2009

(30) Foreign Application Priority Data

Apr. 26, 2005    (JP) ............................. 2005-128128

(51) Int. Cl.
*B60C 23/00*    (2006.01)
(52) U.S. Cl. .................. 340/445; 73/146; 116/34 R
(58) Field of Classification Search .............. 340/445, 340/425.5, 438, 442
See application file for complete search history.

(56) References Cited

U.S. PATENT DOCUMENTS

| 5,432,518 | A |   | 7/1995 | Van Erven |
| 5,790,016 | A |   | 8/1998 | Konchin et al. |
| 6,062,072 | A | * | 5/2000 | Mock et al. ................. 73/146.5 |
| 2005/0163063 | A1 | * | 7/2005 | Kuchler et al. ............... 370/278 |

FOREIGN PATENT DOCUMENTS

| JP | A 10-239197 | 9/1998 |
| JP | A 2000-255229 | 9/2000 |
| JP | A 2003-002019 | 1/2003 |
| JP | A 2004-082775 | 3/2004 |
| JP | A 2004-253858 | 9/2004 |

* cited by examiner

*Primary Examiner*—Brian A Zimmerman
*Assistant Examiner*—Sara Samson
(74) *Attorney, Agent, or Firm*—Oliff & Berridge, PLC

(57) ABSTRACT

Electromagnetic field transmissions between a sensor unit mounted on the inside surface of a tire and a sensor control unit mounted on the vehicle body are attenuated by the wall surface of a tire disposed between the units, and sensitivity is reduced. A booster antenna (18) is embedded in the tire wall surface between the sensor unit (6) and the sensor control unit (10). The booster antenna (18) is a coil antenna, and is configured so that the resonance frequency, which corresponds to the impedance and capacitance component of the booster antenna coil, corresponds to the frequency f0 of the transmission electromagnetic field of the sensor control unit (10). The booster antenna (18) is disposed in a position in which a magnetic coupling is formed with the coil antenna of the sensor unit (6), and transmissions via the electromagnetic field between the sensor unit (6) and the sensor control unit (10) are carried out through the booster antenna (18).

10 Claims, 4 Drawing Sheets

TIRE SENSOR SYSTEM AND TIRE USED FOR THE SAME

TECHNICAL FIELD

The present invention relates to a tire sensor system in which the output of a sensor disposed in the tires of an automobile or the like can be used on the vehicle body, and to a tire used for the same.

BACKGROUND ART

There is a trend in the United States in recent years in mandating that a tire air pressure monitoring system be mounted in automobiles. Conventionally, there are systems that do not require a battery because of the use of a surface acoustic wave (SAW) device as a method for directly measuring the air pressure of a tire.

An RFID (Radio Frequency Identification) technique is known in which a wireless connection is provided between a tire-mounted pressure sensor and a controller on the vehicle body, and the two are electromagnetically coupled together. In a configuration that uses this RFID technique, an RFID transponder (RF tag) containing an inflation pressure sensor is disposed in the internal space of the tire, and a reader/writer is disposed on the vehicle body.

DISCLOSURE OF THE INVENTION

Problem to be Solved by the Invention

Rubber or another material constituting a tire is present between the RFID transponder in the tire and the reader/writer on the vehicle body. For this reason, the mutual electromagnetic coupling between the RFID transponder and reader/writer weakens, and this may become an obstacle when the output results of the sensor in the tire are received on the vehicle body. On the other hand, power consumption increases when the transmission output of the RFID transponder increases.

An object of the present invention is to solve the above-stated problems and to provide a tire sensor system and tire that allows the output of a sensor in a tire to be determined with low power consumption and high sensitivity.

Means for Solving the Problem

The tire sensor system of the present invention is a system in which a control unit disposed in a vehicle body and a sensor unit disposed inside a tire attached to the vehicle body are wirelessly connected, characterized by comprising a booster antenna embedded in the material constituting the tire; wherein the control unit generates a transmission electromagnetic field that varies with time and senses electromagnetic field fluctuations produced by the sensor unit; the sensor unit comprises a sensor for measuring a predefined target value in the tire, a response circuit for generating transmission alternating current modulated in accordance with the output of the sensor, and a primary coil antenna for generating electromagnetic field fluctuations on the basis of the transmission alternating current; and the booster antenna is a secondary coil antenna disposed in a manner that allows magnetic coupling with the primary coil antenna.

Another tire sensor system of the present invention is a system in which a control unit disposed in a vehicle body and a sensor unit disposed inside a tire attached to the vehicle body are wirelessly connected, characterized by comprising a plurality of booster antennas embedded in the material constituting the tire; wherein the control unit generates a transmission electromagnetic field that varies with time and senses electromagnetic field fluctuations produced by the sensor unit; the sensor unit comprises a sensor for measuring a predefined target value in the tire, a response circuit for generating transmission alternating current modulated in accordance with the output of the sensor, and a primary coil antenna for generating electromagnetic field fluctuations on the basis of the transmission alternating current; the plurality of booster antennas constitutes secondary coil antennas disposed along the circumference of the tire while being sequentially interlinked with each other via magnetic coupling; and at least one of the booster antennas can be directly magnetically coupled to the primary coil antenna.

In another tire sensor system of the present invention, the plurality of booster antennas is arranged around the entire circumference of the tire.

In another tire sensor system of the present invention, the booster antennas have resonance characteristics that correspond to the fluctuation frequency of the electromagnetic field.

A preferred aspect of the present invention is a tire sensor system in which the primary coil antenna converts variation in the electromagnetic field into drive power of the sensor unit.

A preferred aspect of the present invention is a tire sensor system in which the sensor is an inflation pressure sensor for measuring air pressure in the tire.

The tire of the present invention is one in which a sensor unit for generating electromagnetic field fluctuations in accordance with a transmission electromagnetic field from the exterior is disposed in the space inside the tire, characterized by comprising a booster antenna embedded in the material constituting the tire; wherein the sensor unit comprises a sensor for measuring a predefined target value in the tire; a response circuit for generating transmission alternating current modulated in accordance with the output of the sensor; and a primary coil antenna for generating electromagnetic field fluctuations on the basis of the transmission alternating current; and the booster antenna is a secondary coil antenna disposed in a manner that allows magnetic coupling with the primary coil antenna.

Another tire of the present invention is one in which a sensor unit for generating electromagnetic field fluctuations in accordance with a transmission electromagnetic field from the exterior is disposed in the space inside [the tire], characterized by comprising a plurality of booster antennas embedded in the material constituting the tire; wherein the sensor unit comprises a sensor for measuring a predefined target value in the tire, a response circuit for generating transmission alternating current modulated in accordance with the output of the sensor, and a primary coil antenna for generating electromagnetic field fluctuations on the basis of the transmission alternating current; the plurality of booster antennas constitutes secondary coil antennas disposed along the circumference of the tire while being sequentially interlinked with each other via magnetic coupling; and at least one of the booster antennas can be directly magnetically coupled to the primary coil antenna.

In another tire of the present invention, the plurality of booster antennas is arranged around the entire circumference of the tire.

In another tire of the present invention, the booster antennas have resonance characteristics that correspond to the fluctuation frequency of the electromagnetic field.

A preferred aspect of the present invention is a tire in which the primary coil antenna converts variation in the electromagnetic field into drive power of the sensor unit.

A preferred aspect of the present invention is a tire in which the sensor is an inflation pressure sensor for measuring air pressure in the tire.

EFFECT OF THE INVENTION

In accordance with the present invention, a booster antenna is embedded inside the constituent elements of the tire that is present between the control unit on the vehicle body and the sensor unit inside the tire. The booster antenna is disposed within the electromagnetic field fluctuations between the sensor unit and sensor control unit, and reduces the attenuation of the electromagnetic field fluctuations transmitted between the two units. Therefore, a tire sensor system can be obtained that can determine the output of the sensor in the tire.

BEST MODE FOR CARRYING OUT THE INVENTION

Examples (hereinafter referred to as embodiments) of the present invention are described below with reference to the drawings.

Figure 1:
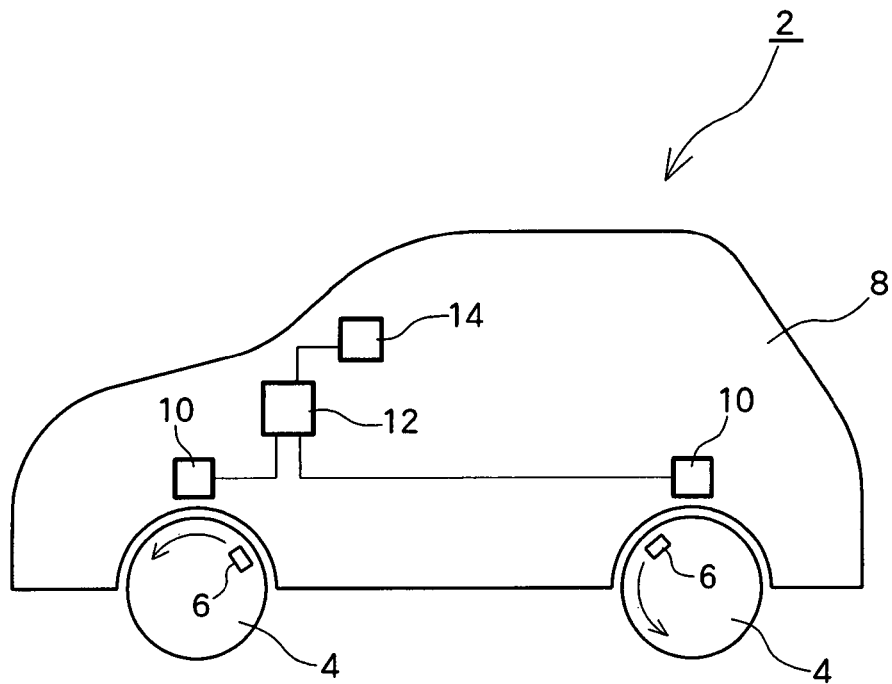
FIG. 1 is a schematic diagram showing the general configuration of a tire inflation pressure determining system according to the embodiments.

FIG. 1 is a schematic diagram showing the general configuration of a tire inflation pressure determining system for determining the tire air pressure of an automobile or another vehicle. The present system is composed of a booster antenna (not shown) and a sensor unit 6 mounted on each tire 4 of an automobile 2, and a sensor control unit 10 mounted in a position near [each] tire 4 of the vehicle body 8. The sensor units 6 and the sensor control units 10 are wirelessly connected. The sensor unit 6 determines the air pressure of a mounted tire and transmits the data. The sensor control unit 10 determines the data transmitted by the sensor units 6, and notifies, e.g., the ECU or other vehicle control unit 12. The vehicle control unit 12 can control the operation of the vehicle in accordance, e.g., with tire air pressure, and display the measurement results of the tire air pressure on a display device 14 to notify the driver.

Figure 2:
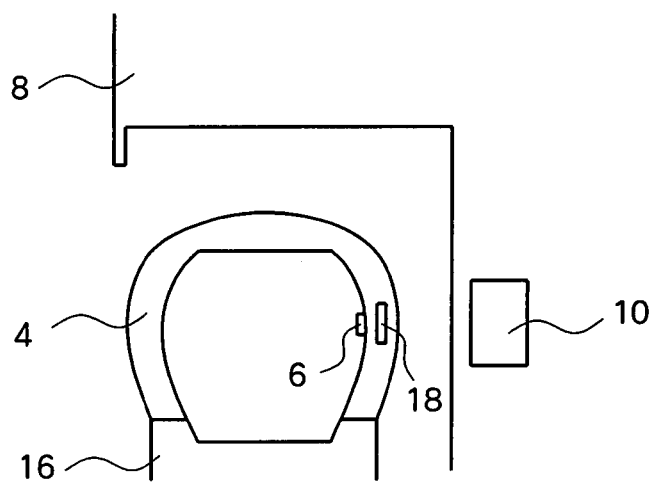
FIG. 2 is a schematic diagram showing the configuration of the tire of an automobile and the vicinity of the tire according to the embodiments.

FIG. 2 is a schematic diagram showing the configuration of the tire 4 of an automobile 2 and the vicinity of the tire, and the diagram shows a cross section orthogonal to the axis along the longitudinal direction of the vehicle body 8. The sensor unit 6 is mounted on the inner surface of the tire 4, which is mounted on a wheel 16. For example, the sensor unit 6 is mounted on the inside surface of the side portion of the tire, and a booster antenna 18 is embedded inside the side surface material of the tire 4 on which the sensor unit 6 is mounted. The booster antenna 18 is basically a coil, and one of the aperture planes is disposed facing the sensor unit 6. The sensor control unit 10 is disposed in the vehicle body 8 in a position that faces the side surface of the tire 4 in a mounted state on the vehicle body 8. As the tire 4 rotates and the sensor unit 6 approaches the sensor control unit 10, electromagnetic field fluctuations are transmitted between the two components. The booster antenna 18 is brought between the sensor unit 6 and sensor control unit 10 at such timing, and acts to reduce the attenuation of the electromagnetic field fluctuations.

Figure 3:
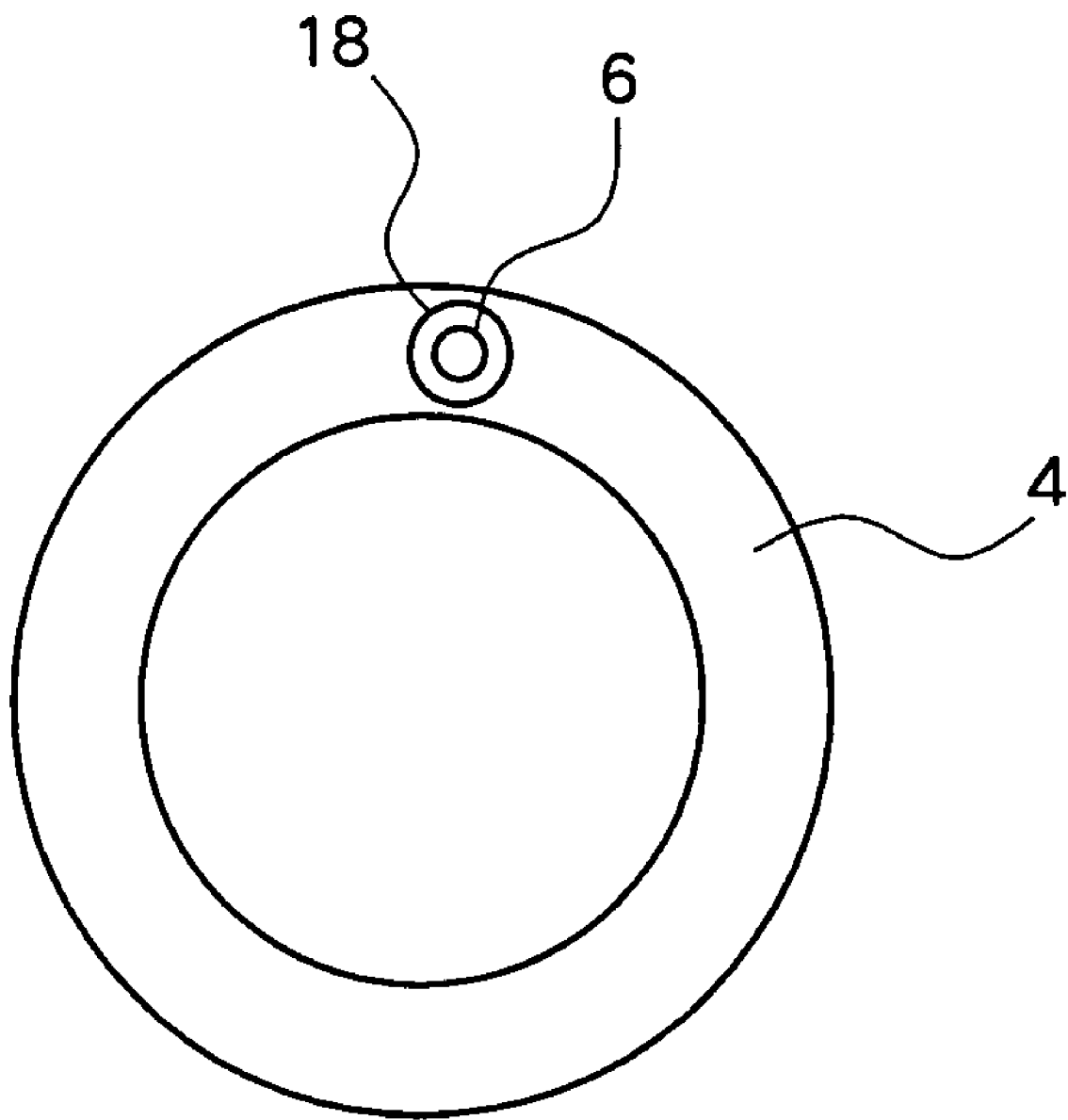
FIG. 3 is a schematic side view of the tire of configuration example 1 related to the embodiments.

FIG. 3 is a schematic side view of an example of the tire 4. In the example shown in FIG. 3, the sensor unit 6 and booster antenna 18 are disposed so as to mutually overlap on the circumference, e.g., in a single location, of the tire 4.

Figure 4:
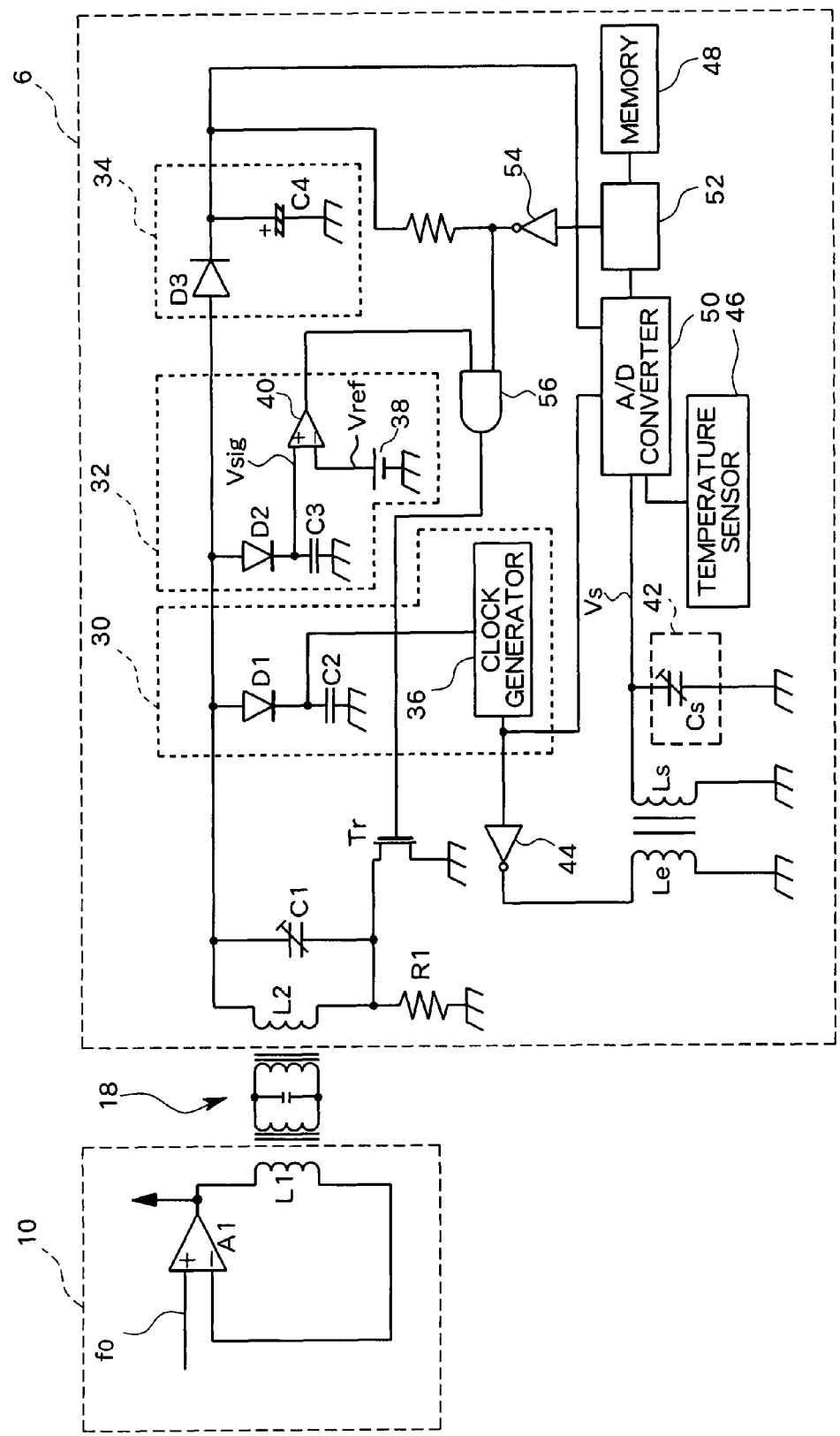
FIG. 4 is a schematic circuit diagram of the sensor unit and sensor control unit in the embodiments.

FIG. 4 is a schematic circuit diagram of the sensor unit 6, the booster antenna 18, and the sensor control unit 10. The sensor control unit 10 is composed of a coil L1 and an operational amplifier A1. The operational amplifier A1 is configured so that the amplifier output and one of the input terminals are connected via the coil L1, and the amplifier generates AC current having a frequency f0 in the coil L1 in accordance with the clock having the frequency f0 fed to the other of its input terminals. The coil L1 determines magnetic field fluctuations generated by the sensor unit 6 and converts the fluctuations into voltage. Specifically, the voltage variations having the frequency f0, which are fed from the operational amplifier A1 to the coil L1, are amplitude-modulated in accordance with the data sent from the sensor unit 6. For example, the voltage of the output terminal of the operational amplifier A1 is brought out as the output voltage of the coil L1. The sensor control unit 10 detects voltage variations of the output terminal of the operational amplifier A1, extracts data sent from the sensor unit 6, and presents the data to the vehicle control unit 12.

With this system, the electromagnetic coupling of the sensor control unit 10 and sensor unit 6 can be strengthened via the booster antenna 18 when the two units come into close proximity. In other words, the booster antenna 18 provides a relay between the sensor unit 6 and sensor control unit 10, and the attenuation of the electromagnetic field fluctuations caused by the distance or the medium between the two units, particularly the wall surface of the tire 4, can be reduced. In the present system, this method is used to implement an advantageous wireless connection between the sensor unit 6 and sensor control unit 10.

The booster antenna 18 is composed of a coil as the main component, and the coil L2 of the sensor unit 6 is disposed so as to form a magnetic coupling. For example, the two coils form a good magnetic coupling when the faces of the two coils are disposed so as to face each other. The booster antenna 18 has resonance characteristics that correspond to the impedance and capacitance component of the booster antenna coil. The resonance characteristics are set with consideration given to the frequency of the electromagnetic field fluctuations produced by the coil L1 of the sensor control unit 10. Specifically, circuit constants such as the size and number of windings of the coil of the booster antenna 18 are set so that the booster antenna 18 can resonate with the electromagnetic field fluctuations having a frequency f0 produced by the sensor control unit 10. The booster antenna 18 produces a resonance phenomenon in the frequency f0 component produced by the sensor control unit 10, whereby the frequency f0 component is effectively transmitted to the coil L2 that magnetically couples with the booster antenna 18.

In the sensor unit 6, a capacitor C1 is connected in parallel to the coil L2, and the coil L2 and capacitor C1 constitute a parallel LC resonance circuit. The capacitance of the capacitor C1 is set so that the resonance frequency of the parallel LC resonance circuit is f0. The configuration of the LC resonance circuit allows the coil L2 to create a resonance effect in the frequency f0 component generated by the sensor control unit 10 in the external AC electromagnetic field, and to amplify the voltage amplitude of the alternating current generated between both ends of the coil L2. One of the terminals of the coil L2 is grounded via a resistance R1 and is connected to a later-described transistor Tr.

A clock generation circuit 30, a level-sensing circuit 32, and a power circuit 34 are connected to the other terminal of the coil L2.

The clock generation circuit 30 is composed of a diode D1, a capacitor C2, and a clock generator 36. One terminal of the diode D1 is connected to the coil L2, and the other terminal is connected to one of the terminals of the capacitor C2 and to the clock generator 36. The other terminal of the capacitor C2 is grounded. Alternating current generated by the coil L2 is inputted to the diode D1 and is half-wave rectified and outputted. Since the capacitor C2 has relatively low capacitance and the smoothing effect of the capacitor C2 is low, a voltage signal that fluctuates in accordance with the frequency f0 outputted from the diode D1 is inputted to the clock generator 36. The clock generator 36 receives this voltage signal as a reference signal and generates and outputs a clock signal in correspondence with the cycle thereof. For example, the clock generator 36 outputs a clock signal having the same frequency f0 as the reference signal. The clock generator 36 may also be configured to generate and output a clock signal having a frequency obtained by dividing the reference signal.

The level-sensing circuit 32 is composed of a diode D2, a capacitor C3, a reference voltage source 38, and a comparator 40. One terminal of the diode D2 is connected to the coil L2, and the other terminal is connected to one of the terminals of the capacitor C3 and to the comparator 40. The other terminal of the capacitor C3 is grounded. Alternating current generated by the coil L2 is inputted to the diode D2 and is half-wave rectified and outputted. The capacitor C3 has a capacitance sufficient to smooth the fluctuations of a relatively high frequency f0, e.g., several 100 kHz to several 10 kHz. In other words, the diode D2 and capacitor C3 detect voltage signals having a frequency f0 produced in the coil L2, and draw out the amplitude-modulated component. As a result, voltage fluctuations having a lower frequency than the frequency f0 that appears in the output of the diode D2 are drawn out from the capacitor C3, and this is inputted to one of the terminals of the comparator 40. In the present system, such fluctuations at low frequencies can be produced by periodic variations in the distance between the sensor unit 6 and sensor control unit 10 due to the rotation of the tire 4 on which the sensor unit 6 is mounted.

The comparator 40 compares a voltage signal Vsig from the capacitor C3 inputted to one of the terminals, and a constant voltage Vref inputted from the reference voltage source 38 to the other terminal, outputs an H level voltage that corresponds to a digital value of "1" when the Vsig is at the threshold voltage Vref or higher, and outputs an L level voltage that corresponds to a digital value of "0" when Vsig is less than Vref. The output of the comparator 40 is used for transmitting data to be sent only when the sensor unit 6 has approached to within a predefined distance of the sensor control unit 10. To this end, the voltage Vref of the reference voltage source 38 is set in advance based on the value of Vsig when the sensor unit 6 has approached the sensor control unit 10. The reference voltage source 38 may be configured via a regulator circuit or the like.

The power circuit 34 is composed of a diode D3 and a capacitor C4, and feeds power that is required for each part of the sensor unit 6. The diode D3 is disposed between the input and output terminals of the power circuit 34, and one of the terminals of the capacitor C4 is connected to the output terminal of the power circuit 34. The other terminal of the capacitor C4 is grounded. The input terminal of the power circuit 34 is connected to the coil L2. The diode D3 rectifies the alternating current from the coil L2, and the capacitor C4 is charged by the output of the diode D3. The capacitor C4 is composed of an electrolytic capacitor or another capacitor that has a large capacitance. The capacitor C3 smoothes and rectifies the output of the diode D3 and outputs the rectified current from the power circuit 34.

The sensor unit 6 is provided with an inflation pressure sensor 42 that determines the air pressure of a tire. The inflation pressure sensor 42 is a capacitance inflation pressure sensor and is a sensor element that varies the electrical capacitance Cs in accordance with inflation pressure P. The capacitance Cs of the inflation pressure sensor 42 and the coil Ls together constitute a parallel LC resonance circuit. The coil Ls is transformer coupled to the coil Le. The coil Le receives as input the clock generated by the clock generator 36 by way of a buffer circuit 44.

Figure 5:
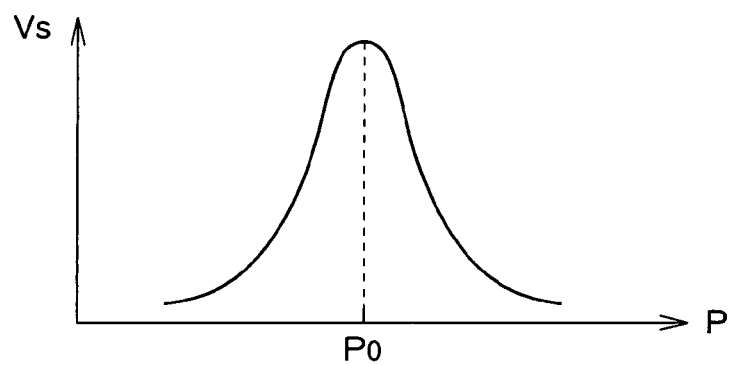
FIG. 5 is a schematic graph showing the variation of output voltage Vs of an LC resonance circuit composed of a coil Ls and a capacitance Cs, with respect to the air pressure P of the tire.

FIG. 5 is a schematic graph showing the variation of output voltage Vs of an LC resonance circuit, which is composed of the coil Ls and the capacitance Cs, with respect to the air pressure P of the tire. The LC resonance circuit is configured so as to resonate at the frequency of the output clock of the clock generator 36 and to cause the voltage Vs to reaches a maximum with respect to the value the capacitance Cs at the reference inflation pressure P0. The voltage Vs decreases as the air pressure P becomes offset from the reference inflation pressure P0. For example, a configuration may be adopted in which the reference inflation pressure P0 is set to the central value of an inflation pressure range that is deemed to be normal, and the vehicle control unit 12 is considered to be normal when the voltage Vs is at a predefined threshold value or higher.

The sensor unit 6 may be provided with a temperature sensor 46 and a memory 48.

The output voltage Vs of the LC resonance circuit and the output voltage of the temperature sensor 46 are inputted to an A/D (Analog-to-Digital) conversion circuit 50. The A/D conversion circuit 50 converts these analog input signals into digital data. The A/D conversion circuit 50 is supplied with driving power from the power circuit 34, and may be configured so as to use the output clock of the clock generator 36 in the A/D conversion processing.

The type and manufacture date of the tire, and other information related to the tire on which the sensor unit 6 is mounted are stored in the memory 48 in advance.

The transmission data generation circuit 52 reads the information from the memory 48 and generates transmission data stored in a predefined format. This data is composed of data that expresses the information and data that is output from the A/D conversion circuit 50. The transmission data generation circuit 52 switches between an H level and an L level in accordance with the bit sequence constituting the transmission data.

The output of the transmission data generation circuit 52 is inputted to one of the terminals of an AND gate 56 via a buffer circuit 54. The output of the level-sensing circuit 32 is inputted to the other terminal of the AND gate 56. The AND gate 56 allows transmission data that contains inflation pressure data and the like to pass through only when the output of the level-sensing circuit 32 is at an H level.

The output of the AND gate 56 is presented to a gate of a transistor Tr. For example, the transistor Tr is switched on when the output of the AND gate 56 is at an H level, and the coil L2 is grounded via the transistor Tr. On the other hand, the transistor Tr is switched off when the output of the AND gate 56 is at an L level, and the coil L2 is grounded via the resistor R1. With this configuration, the impedance of the coil L2 is reduced more when the transistor Tr is on than when the transistor Tr is off.

Variation in the impedance of the coil L2 causes fluctuations in the electromagnetic field that couples the coil L2 and the booster antenna 18, causes fluctuations in the electromagnetic field that couples the booster antenna 18 and the coil L1, and affects the voltage between the terminals of the coil L1 nearer the sensor control unit 10. Specifically, the sensor control unit 10 can, with the aid of the coil L1, sense as voltage variation the fluctuations in the electromagnetic field that are generated by the sensor unit 6 in accordance with the transmission data. The sensor control unit 10 reproduces the transmission data from the sensor unit 6 by detecting the voltage variation superimposed on the carrier of the frequency f0, and outputs the result to the vehicle control unit 12.

Figure 6:
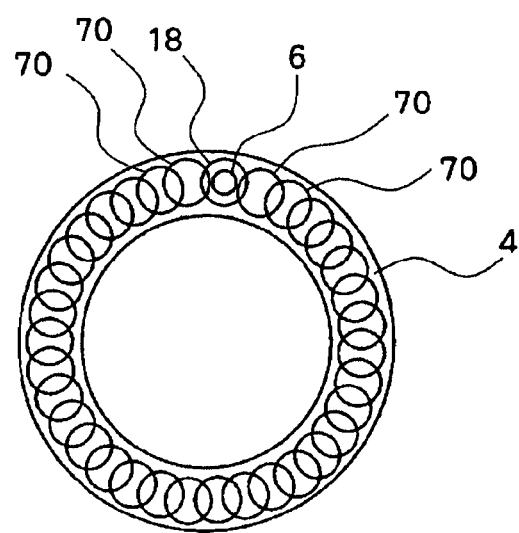
FIG. 6 is a schematic diagram showing the tire as viewed from the side of configuration example 2 related to the embodiments.

In the configuration described above, a single booster antenna 18 is provided in a position that corresponds to the sensor unit 6. However, a configuration is also possible in which a plurality of booster antennas 18 is provided. FIG. 6 is a schematic side view of the tire 4, which is an example of such a configuration. In the example shown in FIG. 6, a plurality of booster antennas 18 and 70 is arranged along the circumference of the tire 4. In this case, the booster antenna 18 is directly magnetically coupled to the coil L2 of the sensor unit 6, but the booster antennas 70 are arranged so that the coil faces partially overlap the adjacent coils and form a magnetic coupling. The booster antennas 70 are interlinked in sequence from the booster antenna 18 by the magnetic coupling of mutually adjacent coils, and are indirectly magnetically coupled to the coil L2 via the booster antenna 18. For example, the booster antennas 70 may be arranged around the entire circumference of the tire 4 as shown in FIG. 6. With this configuration, any one of the booster antennas 18 and 70 is disposed opposite to, and is magnetically coupled with, the coil L1 of the sensor control unit 10 regardless of the rotational position of the tire 4. In other words, fluctuations in the electromagnetic field can be transmitted between the coils L2 and L1 through the booster antennas 18 and 70 even when the sensor unit 6 is not in a position that faces the sensor control unit 10. The air pressure of the tire can thereby be monitored from the vehicle body side regardless of the rotational position of the tire 4.

The inter-linkage of the booster antennas 70 may be arranged only in a portion of the circumference of the tire. In such a case, transmission via the electromagnetic field between the coils L2 and L1 can be carried out in the range of the rotational angle in which the inter-linkage is disposed.

The invention claimed is:

1. A tire sensor system in which a control unit disposed in a vehicle body and a sensor unit disposed inside a tire attached to the vehicle body are wirelessly connected, the tire sensor system comprising:

a plurality of booster antennas embedded in the material constituting the tire; wherein
the control unit generates a transmission electromagnetic field that varies with time and senses electromagnetic field fluctuations produced by the sensor unit;
the sensor unit comprises:
a sensor for measuring a predefined target value in the tire,
a response circuit for generating transmission alternating current modulated in accordance with the output of the sensor, and
a primary coil antenna for generating electromagnetic field fluctuations on the basis of the transmission alternating current;
wherein the plurality of booster antennas constitutes secondary coil antennas lined up along a circumference of the tire,
the plurality of booster antennas are arranged so that a coil face of a first booster antenna partially overlaps a coil face of a second booster antenna, the coil face of the second booster antenna partially overlaps the coil face of the first booster antenna and a coil face of a third booster antenna, and the coil face of the third booster antenna does not partially overlap the coil face of the first booster antenna,
coil faces of the plurality of booster antennas are sequentially interlinked with each other via magnetic; coupling, and
at least one of the plurality of booster antennas is directly magnetically coupled to the primary coil antenna.

2. The tire sensor system of claim 1, wherein the plurality of booster antennas is arranged around an entire circumference of the tire.

3. The tire sensor system of claim 1, wherein the booster antennas have resonance characteristics that correspond to a fluctuation frequency of the transmission electromagnetic field.

4. The tire sensor system of claim 1, wherein the primary coil antenna converts variation in the transmission electromagnetic field into drive power of the sensor unit.

5. The tire sensor system of claim 1, wherein the sensor is an inflation pressure sensor for measuring air pressure in the tire.

6. A tire in which a sensor unit for generating electromagnetic field fluctuations in accordance with a transmission electromagnetic field from the exterior is disposed in the space inside the tire, the tire comprising:
a plurality of booster antennas embedded in the material constituting the tire; wherein
the sensor unit comprises:
a sensor for measuring a predefined target value in the tire,
a response circuit for generating transmission alternating current modulated in accordance with the output of the sensor, and
a primary coil antenna for generating electromagnetic field fluctuations on the basis of the transmission alternating current;
wherein the plurality of booster antennas constitutes secondary coil antennas lined up along a circumference of the tire,
the plurality of booster antennas are arranged so that a coil face of a first boost antenna partially overlaps a coil face of a second booster antenna, the coil face of the second booster antenna partially overlaps the coil face of the first booster antenna and a coil face of a third booster antenna, and the coil face of the third booster antenna does not partially overlap the coil face of the first booster antenna, coil faces of the plurality of booster antennas are sequentially interlinked with each other via magnetic coupling, and at least one of the plurality of booster antennas is directly magnetically coupled to the primary coil antenna.

7. The tire of claim 6, wherein the plurality of booster antennas is arranged around an entire circumference of the tire.

8. The tire of claim 6, wherein the booster antennas have resonance characteristics that correspond to a fluctuation frequency of the transmission electromagnetic field.

9. The tire of claim 6, wherein the primary coil antenna converts variation in the transmission electromagnetic field into drive power of the sensor unit.

10. The tire of claim 6, wherein the sensor is an inflation pressure sensor for measuring air pressure in the tire.

* * * * *